United States Patent [19]

Nagai et al.

[11] 4,317,090
[45] Feb. 23, 1982

[54] LASER OSCILLATOR

[75] Inventors: Akio Nagai; Haruhiko Nagai; Masao Hishii, all of Amagasaki, Japan

[73] Assignee: Mitsubishi Denki Kabushiki Kaisha, Tokyo, Japan

[21] Appl. No.: 59,858

[22] Filed: Jul. 20, 1979

[51] Int. Cl.³ .............................................. H01S 3/09
[52] U.S. Cl. .................................... 372/58; 372/34; 372/99
[58] Field of Search ................. 331/94.5 G, 94.5 CM, 331/93, 94.5 N, 94.5 P; 313/220

[56] References Cited

U.S. PATENT DOCUMENTS 3,428,914 2/1969 Bell ................................. 331/94.5 C
3,969,684 7/1976 de Witte et al. ............... 331/94.5 M Primary Examiner—William L. Sikes
Assistant Examiner—Leon Scott, Jr.
Attorney, Agent, or Firm—Sughrue, Mion, Zinn, Macpeak and Seas

[57] ABSTRACT

An electrical discharge occurs between the anode and the cathode and the active gas such as $CO_2$ between the two electrodes is excited to provide a laser beam. The laser beam thus provided is reflected repeatedly by a pair of reflection mirrors. The reflected laser beam is amplified while passing through the space where the discharge occurs, thus providing the function of a gas laser oscillator. Although the amplification that occurs in the discharge zone between the electrodes, considerable laser beam absorption takes place in the space between the reflection mirrors and the electrodes. In this space, the amount of operating gas such as $CO_2$ is reduced, or the space is evacuated. Alternatively, the space is cooled by causing the gas therein to flow. A reduction in so-called laser beam absorption function is provided.

14 Claims, 9 Drawing Figures

LASER OSCILLATOR

BACKGROUND OF THE INVENTION

1. Field of the Invention

This invention relates to so-called molecular gas laser oscillators in which laser transitions occur among low-lying vibrational levels in the ground electric state such as CO laser oscillator, a $N_2O$ laser oscillator and a $CO_2$ laser oscillator. More particularly, it relates to a gas laser oscillator which is improved to protect the oscillation characteristic, etc. from being adversely effected by the absorption of the laser beam.

2. Description of the Prior Art

A variety of gas laser oscillators such as a CO laser oscillator, a $N_2O$ laser oscillator, and a $CO_2$ laser oscillator have been proposed and are known in the art.

The $CO_2$ laser oscillator will be described by way of example. The amplification and output characteristics of various $CO_2$ lasers have been investigated in detail; however, the effect of the above-described light absorption action on the output characteristic is not generally well known. The reason is that the effect of the light absorption action on the output characteristic of a low pressure (lower than about 50 torr) continuous oscillation $CO_2$ laser or a pulsed $CO_2$ laser is less. However, the light absorption action greatly affects the output characteristic of a high pressure continuous oscillation $CO_2$ laser as described herein.

First, the relation between the action of light absorption and the oscillation characteristic will be described with reference to a typical or simplified internal mirror $CO_2$ laser oscillator. The arrangement of the oscillator is as shown in FIG. 1. In FIG. 1, reference numeral 1 designates a laser medium formed by discharge; 2a and 2b, non-discharge portions; 3, a total reflection mirror; 4, a partial reflection mirror; and, 5 a laser beam.

In general, when a gas mixture of $CO_2$—$N_2$—$H_e$ or the like is excited by discharge, then the population inversion is formed between the $CO_2$ (0 0° 1) and (1 0° 0), and the laser medium 1 becomes active. When the total reflection mirror 3 and the partial reflection mirror 4 having a predetermined reflectance are disposed on both sides of the laser medium 1 in such a manner that they confront each other, then laser oscillation is caused to emit the laser beam 5 from the oscillator.

In general, the laser output P is:

$$P \cong A I s \frac{t}{a + t} \left( g_o l + \ln \sqrt{1 - a - t} \right) \quad (1)$$

Where; A is the sectional area of the laser beam, Is is the saturation parameter, t is the transmission of the partial reflection mirror 4, $g_o$ is the unsaturated gain of the laser medium 1, l is the length, in the optical axis direction, of the laser medium, and a is the total loss of the resonator.

Consider now the total loss a of the resonator in the equation (I). The total loss a includes the entire diffraction loss of the resonator, the laser beam absorption and scattering loss of the two confronted mirrors, and the $CO_2$ molecule absorption loss of the non-discharge portions. Among the three kinds of loss, the former two kinds of loss depend on the geometrical arrangement of the resonator and both the surface accuracy and the materials of the mirrors. However, the remaining loss, or the $CO_2$ absorption loss, depends on the mixing ratio of the gas mixture, the gas temperature, and the total pressure. However, in the case where the total pressure is higher than 50 torr, i.e., in the pressure range where line width of the absorption spectrum is dominated by the collision broadening the absorption loss is independent of the total pressure.

Shown in FIG. 2 are the $CO_2$ molecule absorption coefficients on the P(20) line in the $CO_2$ 10.4 μm band which are calculated as a function of gas temperature. The absorption loss is represented by the product of the absorption coefficient and the length of the non-discharge portion. The absorption coefficient increases abruptly with increasing gas temperature at near room temperature, and has a tendency to saturate at near 600° K. In the case when the gas temperature is maintained unchanged, the absorption coefficient increases in proportion to the mole fraction of $CO_2$ molecules.

If, when the length of the non-discharge portion is for instance, 30 cm, the gas temperature is increased, then the absorption loss becomes about 8% from FIG. 2. In the case of an ordinary low pressure continuous oscillation $CO_2$ laser, even if the non-discharge portion is heated by the $CO_2$ molecule absorption attributed to the laser oscillation, the effect of the absorption loss on the laser output is small because $g_o l$ of the equation (1) has a value more than several hundreds of percent (%) and t can be selected large (t>30%). In practice, the total pressure of the mixture gas used is of the order of 20 torr. Therefore the heat diffusion coefficient of the gas is increased, and the gas temperature increase due to the laser oscillation is limited. Thus, it can be considered that the absorption loss is much smaller than 8%. In the case of the pulse oscillation $CO_2$ laser, the increase of the gas temperature is very small. For instance, if the gas temperature is 300° K., then the absorption loss is about 0.5%. The loss of this order will not significantly affect the laser output.

As was described above, in the case of the ordinary low pressure continuous or the pulse oscillation $CO_2$ laser, the effect of the absorption loss on the laser output is small.

Now, the high pressure continuous oscillation $CO_2$ laser will be described. In view of the following, the laser oscillator of this type has been developed primarily as a laser oscillator small in size and high in output, higher than 1 KW. A laser output obtainable from a unit volume of the laser medium 1 is represented by $g_o \cdot Is$. When the gas pressure is higher than about 50 torr, then $g_o$ is inversely proportional to a gas pressure, and IS is proportional to the square of the gas pressure. Thus, $g_o \cdot Is$ is proportional to the gas pressure.

According to this principle, the laser output is increased as the gas pressure increases. Thus, a high output can be obtained without increasing the size of the oscillator. This method of increasing the gas pressure is extremely effective in practical use. However, since $g_o$ is inversely proportional to the gas pressure, $g_o$ becomes smaller if the gas pressure is increased. Therefore, the value t to maximize the laser output also becomes smaller. In the case when the gas pressure is 300 torr and the laser output is 1 KW, $g_o l$ is of the order of several tens of percent (%) and the value t to maximize the laser output is of the order of 10%. Conversely, it can be considered that as the gas pressure is high, the heat diffusion coefficient of the gas is reduced, and the gas temperature of the non-discharge portion is considerably increased upon laser oscillation. Thus, under the above-described conditions, the absorption loss is of the order of 8%. If these conditions are applied to the equation (1), then it can be estimated that the absorption loss greatly adversely affects the laser output.

With the above-described knowledge, the high pressure continuous oscillation $CO_2$ laser oscillation will now be described in detail.

A conventional laser oscillator of this type is shown in FIG. 3. In FIG. 3, reference characters 6a, 6b and 6c designate blowers for creating gas flows. Arrows 7 indicate the gas flows. A heat exchanger 8 is employed for cooling the mixture gas which has been heated by discharge. Elements 9a and 9b are bellows for changing the angles of the mirrors. And element 10 is a container for sealing the gas mixture therein.

This laser oscillator is a so-called three orthogonal axis type, in which the direction of the laser beam axis, the gas flow and the discharge are mutually perpendicular. The gas mixture containing $CO_2$ molecules in the container 10 is formed into the gas flow by the blowers 6a, 6b and 6c, the gas flow being through the discharge portion and the heat exchanger 8 to the blowers. As is well known in the art, the gas flow is necessary to prevent the reduction of the laser output due to the increase in temperature of the laser medium 1. The velocity of the gas is, in general, in the order of 30 m/sec. The laser medium 1 is formed by glow discharge in a direction perpendicular to the surface of the figure. The total reflection mirror 3 and the partial reflection mirror 4 are disposed on both sides of the laser medium 1, and the laser beam 5 is emitted from the partial reflection mirror 4.

The curve A in FIG. 4 indicates the variations of the laser output with respect to discharge inputs under the following conditions:
Gas mixture: $CO_2$—CO—$N_2$—He=2—1—6—32
Total pressure: 300 torr
Gas velocity: 30 m/sec
Discharge length: 80 cm
Reference of partial reflection mirror's reflection factor: 80%

The laser output rises linearly at the oscillation threshold, and is then saturated in a certain discharge input region C (FIG. 4). Thereafter, the laser output is increased linearly. If it is assumed that the absorption loss of the non-discharge portion does not affect the laser output, then it can be considered from equation (1) that the laser output increases linearly with increasing discharge input. This is because $g_o$ is substantially proportional to the discharge input when the gas temperature of the laser medium is low (the actual gas temperature being lower than 400° K.). The phenomenon where the laser output is saturated in the discharge input region is closely related to the absorption phenomenon of the $CO_2$ molecules. However, the detailed description of this relation will be omitted since it is not directly related to the present invention.

In the conventional high pressure continuous oscillation $CO_2$ laser oscillator, non-discharge portions 2a and 2b are provided as shown in FIG. 3, and the absorption loss in these portion adversely affects the laser output. As described herein, the output of a laser oscillator of this invention is higher by about 40% than that of the conventional one. As was described before, the local gas temperature of the non-discharge portions becomes very high, and therefore, the gas temperature in the portions fluctuates spatially and with time. As a result, the absorption loss is varied and the stability of the laser output is lost. The actual output variation percentage due to this fluctuation is about 10% at a laser power of 1 KW. Furthermore, the temperature of the gas mixture in contact with the surfaces of the total reflection mirror 3 and the partial reflection mirror is greatly increased. These mirrors are heated through heat conduction of the gas. Since the partial reflection mirror 4 is made of Ge, GaAs or ZnSe, if the temperature is increased, then the mirror is broken by the heat stress which is caused inside the mirror.

For the gas laser oscillator, especially the high pressure continuous oscillation gas laser oscillator, it is necessary to increase the oscillation efficiency and the stability of the laser output.

SUMMARY OF THE INVENTION

For the gas laser oscillator, it is necessary to increase the oscillation efficiency and to stabilize the laser output as described above.

Accordingly, an object of the invention is to increase the oscillation efficiency and to stabilize the laser output by taking into consideration the laser beam absorption action of gas mixture in a region having no amplification function. This has not been utilized in the prior art.

A gas laser oscillator having a fundamental arrangement according to the invention comprises a first region having an amplification function in the gas in the mode volume of a resonator and a second region which does not substantially have an amplification function when compared with the first region in the gas.

A gas laser oscillator having another arrangement according to the invention comprises: a first region having an amplification function in the operating gas in the mode volume of a resonator; a second region which does not substantially have an amplification function when compared with the first region in the operating gas and, a blower for supplying the operating gas to the first region. The operating gas in the second region is caused to flow by the blower.

A gas laser oscillator in a third embodiment according to the invention comprises: a pair of reflection mirrors disposed respectively both sides of a laser medium formed by supplying an operating gas to a discharge electrode portion and at predetermined distances from the laser medium and, closed spaces provided between the laser medium and the reflection mirrors and having transmission windows. The closed spaces are maintained substantially in a vacuum state.

A gas laser oscillator in a fourth embodiment according to the invention comprises: a pair of reflection mirrors disposed respectively on both side of a laser medium formed by supplying an operating gas to a discharge electrode portion and at predetermined distances from the laser medium and, closed spaces provided between the laser medium and the reflection mirrors and having transmission windows. The closed spaces are filled with a gas that is lower in laser beam absorption function than the operating gas.

This invention will now be described with reference to the accompanying drawings and the detailed description that follows.

BRIEF DESCRIPTION OF THE DRAWINGS

In the accompanying drawings.

DETAILED DESCRIPTION OF THE INVENTION

A first embodiment of a gas laser oscillator according to this invention will be described with reference to FIG. 5.

Figure 3:
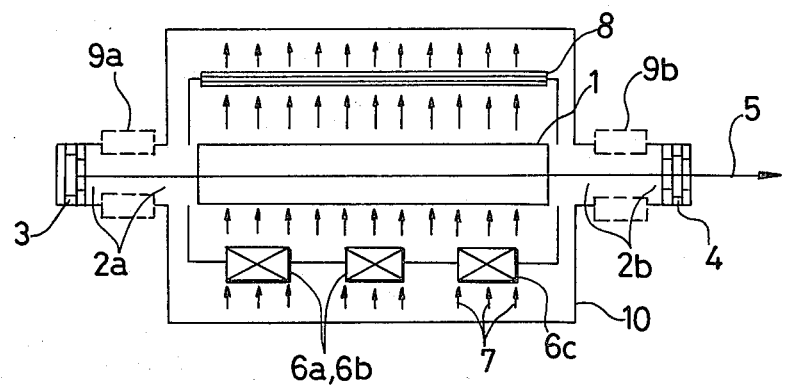
FIG. 3 is an explanatory diagram showing a conventional high pressure continuous oscillation $CO_2$ laser oscillator.
Figure 5:
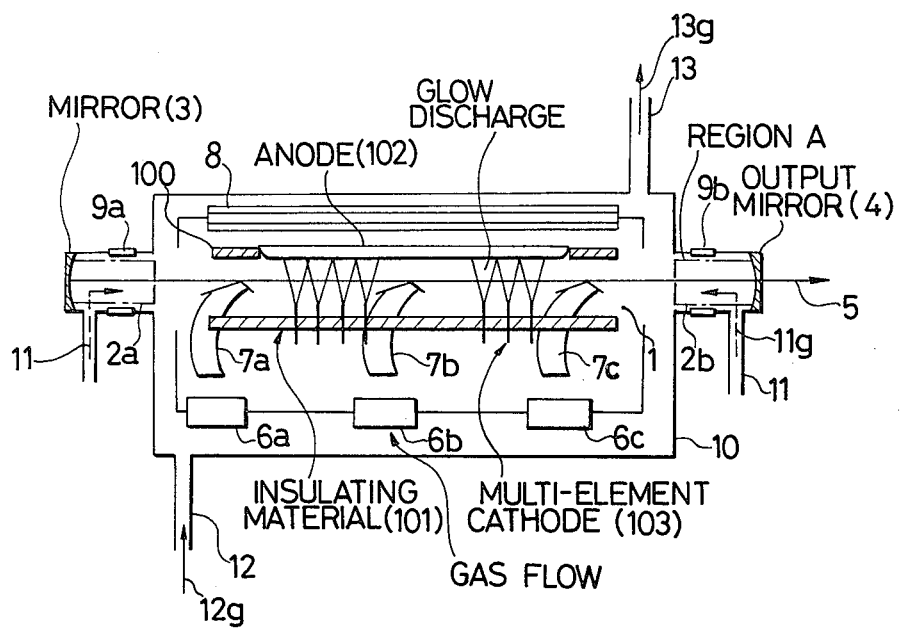
FIG. 5 is an explanatory diagram showing a first embodiment of a high pressure continuous oscillation $CO_2$ laser oscillator according to this invention.

In FIG. 5, reference character 100 designates a discharge portion comprising an insulating material 101, an elongated anode 102 and a multi-element cathode 103. A supply pipe 11 is employed for supplying to non-discharge portions 2a and 2b a gas including no $CO_2$ molecules, such as a CO—$N_2$—He mixture gas. An introduction pipe 12 introduces the gas flow of $CO_2$ molecules into a sealed container 10. A leading pipe 13 leads, for instance, a $CO_2$—CO—$N_2$—He mixture gas out of the container 10. The flow rates of these gas flows 11g, 12g and 13g are controlled so that the mixing ratio and the total pressure in the container 10 are maintained constant at all times. As is apparent from FIG. 5, the directions of a laser beam 5, gas flows 7a, 7b and 7c, glow discharge are mutually perpendicular. The remaining components of the gas laser oscillator are similar to those in the prior art represented in FIG. 3.

The output characteristic of the oscillator thus constructed has been confirmed through experiments. The output characteristic is as indicated by the straight line B in FIG. 4. The operating conditions of the laser oscillation are the same as those described before. The laser output of the oscillator of the invention shown in FIG. 5 is higher by about 40% than that of the conventional one. The oscillation efficiency is also higher by about 40% than that of the conventional oscillator. As is clear from the figure, the output saturation phenomenon accompanying the conventional oscillator is not produced with the oscillator of the invention. When the laser output is 1 KW, the output variation percentage is about 1% which is smaller by an order of magnitude than the output variation percentage of the conventional oscillator.

As described, the performance of the laser oscillator is remarkably improved by decreasing the concentration of $CO_2$ molecules in the non-discharge portion. The reason is that the $CO_2$ molecule absorption coefficient is decreased in proportion to the reduction of $CO_2$ mole fraction. If the absorption coefficient is reduced, then the gas at the non-discharge portion is protected from being heated, the output variation due to the gas temperature fluctuation is considerably reduced, and the abnormal heating action of the partial reflection mirror is not caused.

Figure 4:
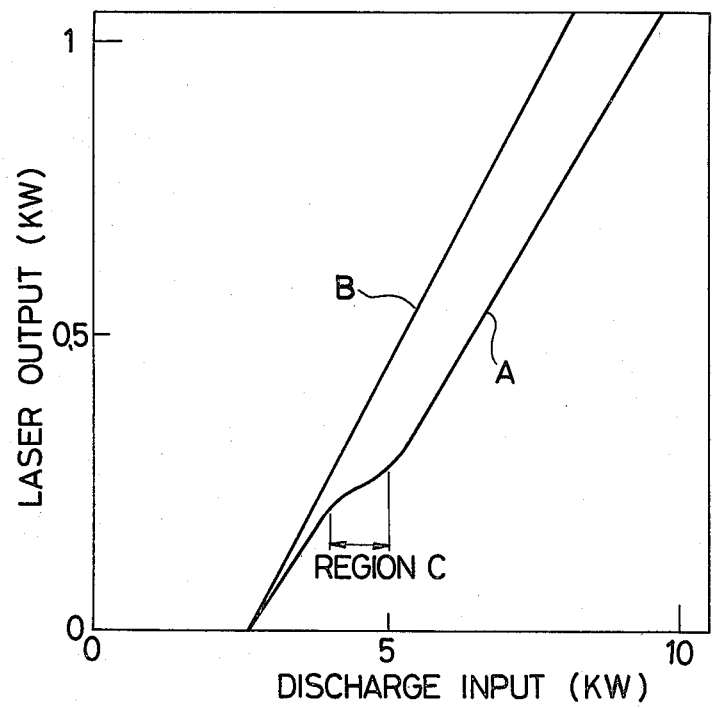
FIG. 4 is a graphical representation indicating laser output characteristics.

In the case where no $CO_2$ molecule is provided in the non-discharge portion, the absorption loss becomes zero, and bad influences such as for instance the above-described oscillation efficiency reduction are not caused. When the $CO_2$ mole fraction in the non-discharge portion is ½ of that of the laser medium, the saturation output indicated by the curve A in FIG. 4 is increased twice. In order to fully obtain the effects of the invention, the maximum $CO_2$ mole fraction permitted under given conditions such as a desired laser output, kinds of mixture gas and the total pressure is determined.

In the above-described example, the gas flow 11g including no $CO_2$ molecules is introduced into the container 10. However, this method may be replaced by a method in which the mixture gas in the container 10 is cooled to remove $CO_2$ molecules therefrom so that the remaining gas, including no $CO_2$ molecules, is introduced into the container 10. The invention has been described with reference to the high pressure continuous oscillation $CO_2$ laser however. It should be noted that the technical concept of the invention can be applied to other types $CO_2$ lasers for the same effects. Furthermore, the above-described oscillator is provided with the stable resonator however, the invention is not so limited. That is, the technical concept of the invention can be applied to other oscillators having unstable resonators or other type resonators, and in this case also the same effects described above can be substantially obtained.

As is clear from the example of the gas laser oscillator described with reference to FIG. 5, according to the invention, the $CO_2$ molecule absorption loss is reduced by decreasing the $CO_2$ molecule concentration in the non-discharge portion. Therefore, the laser oscillator is high in oscillation efficiency and output stability. It can prevent the partial reflection mirror from being damaged even at the time of high output laser oscillation.

Figure 6:
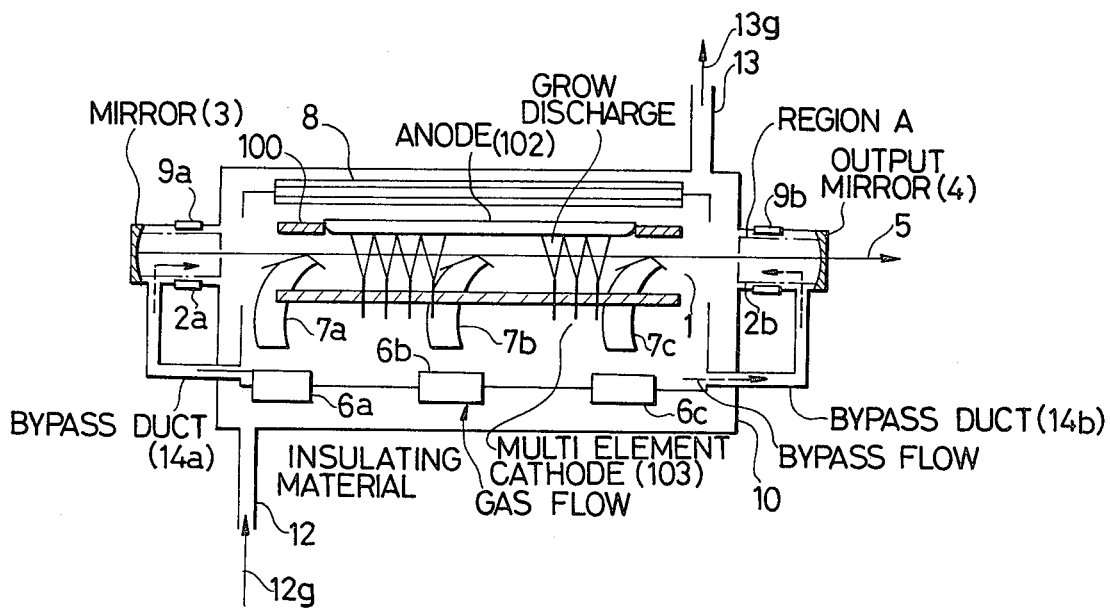
FIG. 6 is an explanatory diagram showing a second embodiment of the high pressure continuous oscillation $CO_2$ laser oscillator according to the invention.

A second embodiment of the gas laser oscillator according to the invention will be described with reference to FIG. 6. In FIG. 6, reference characters 14a and 14b designate bypass ducts for circulating mixture gas to non-discharge portions 2a and 2b by the utilization of static pressure blowers 6. The remaining components are similar to those in FIG. 5. A part of the circulating gas flow formed by the blowers 6 is allowed to flow through the bypass ducts 14a and 14b and to flow from the mirrors towards the laser medium 1 in the non-discharge portions 2.

The output characteristic of the oscillator thus constructed has been confirmed through experiments, and it is as indicated by the straight line B in FIG. 4. With a discharge input of 7 KW, the laser output of the oscillator of the invention is higher by about 40% than that of the conventional one. Therefore, the oscillation efficiency is also higher by about 40% than that of the conventional oscillator. As is apparent from the figure, the output saturation phenomenon in the output characteristic accompanying the conventional oscillator does not occur. When the laser output is 1 KW, the output variation percentage is about 1%, which is smaller by an order of magnitude than the conventional variation percentage.

Figure 1:
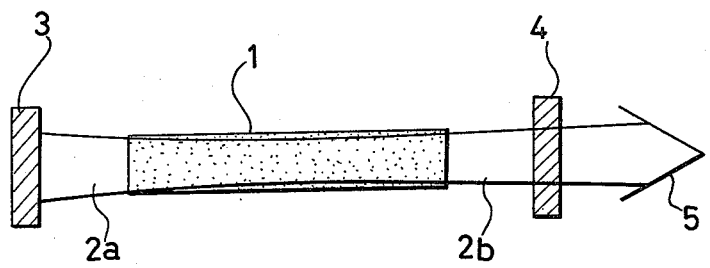
FIG. 1 is an explanatory diagram showing a simplified internal mirror type $CO_2$ laser oscillator.
Figure 2:
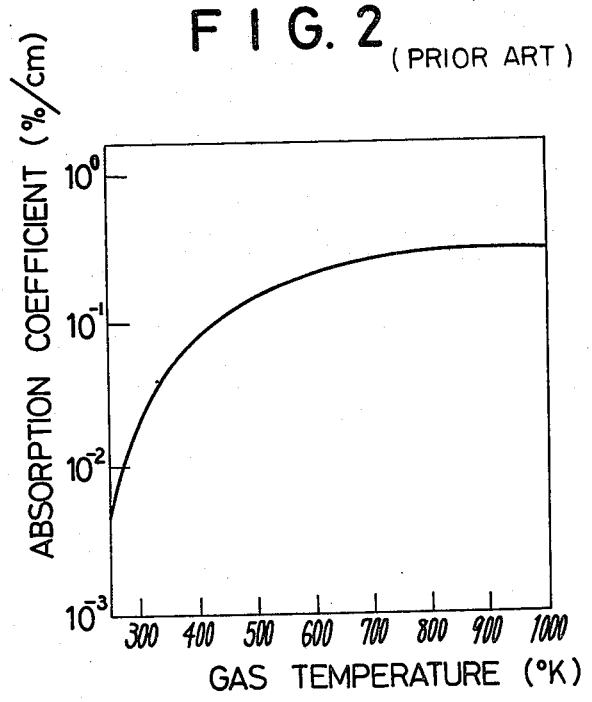
FIG. 2 is a graphical representation indicating the relation between the absorption coefficient of $CO_2$ molecules and gas temperature.

As described above, the performance of the laser oscillator is remarkably improved by feeding gas to the non-discharge portions. The reason is that the gas flows in the non-discharge portions prevent the light absorption and heating of the gas mixture attributing to $CO_2$ molecules. As a result the absorption loss of the laser oscillator is reduced (cf. FIG. 2). As the gas temperature in the non-discharge portions is reduced, the output variation due to the gas temperature fluctuation is decreased, and abnormal heating action of the partial reflection mirror is prevented.

The gas velocity in the non-discharge portion necessary for obtaining the effects of the invention depends on the configuration of the non-discharge portion, the kind of mixture gas, and the total pressure. For a typical example, the gas velocity to obtain the output characteristic indicated by the straight line B in FIG. 4 was several of meters per seconds. As the gas velocity is increased, the absorption loss by $CO_2$ molecules is decreased. If a cooler is provided at a part of the supply pipe 11 to cool the gas flowing in the non-discharge portion, the absorption loss is reduced, and the gas velocity necessary to obtain the effects of the invention can be decreased.

In the above-described second embodiment, the gas flows are formed in the non-discharge portions 2 by utilizing the blowers 6a, 6b and 6c adapted to feed gas to the laser medium 1. However, other blowers may be provided to feed the gas to the non-discharge portions. The direction of the gas flow can be selected as desired.

Figure 7:
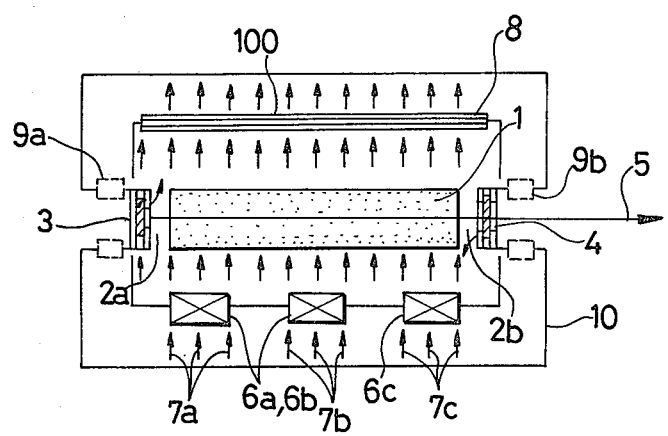
FIG. 7 is an explanatory diagram showing a third embodiment of the high pressure continuous oscillation $CO_2$ laser oscillator according to the invention.

A third embodiment of the gas laser oscillator according to the invention will be described with reference to FIG. 7. As is clear from FIG. 7, the gas flows in the non-discharge portions at high speed, and therefore the same effects as described above can be obtained. The invention has been described with reference to the high pressure continuous oscillation $CO_2$ laser, however, it should be noted that the technical concept of the invention can be applied to other $CO_2$ laser oscillators or other gas laser oscillators, and in this case also the same effects can be obtained. Furthermore, the abovedescribed oscillator is provided with the stable resonator, however, the invention is not limited thereto. That is, the technical concept of the invention can be applied to other oscillators having unstable resonators or other type resonators, and in this case also the same effects described above can be substantially obtained.

Figure 8:
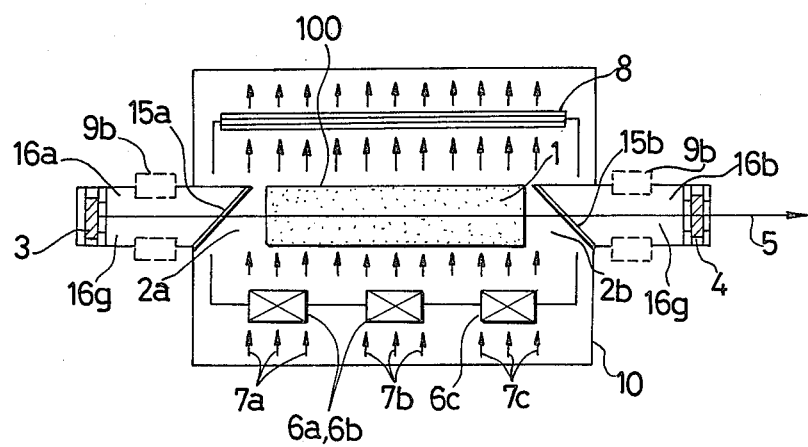
FIG. 8 is an explanatory diagram showing a fourth embodiment of the high pressure continuous oscillation $CO_2$ laser oscillator according to the invention.

A fourth embodiment of the gas laser oscillator according to the invention will be described with reference to FIG. 8. In FIG. 8, reference characters 15a and 15b designate Brewster windows, and reference characters 16a and 16b designates sealed chambers. A gas 16g, which slightly absorbs the oscillated laser beam, is contained in the chambers 16, or the chambers 16 are evacuated. The remaining components are similar to those in FIG. 5.

The surfaces, confronted with the laser medium 1, of the Brewster windows 14 are exposed to the gas flow, and therefore the heating action of the mixture gas locally left in the non-discharge portions 2 can be prevented.

The output characteristic of the oscillator thus constructed has been confirmed through experiments, and it is as indicated by the straight line B in FIG. 4. The operating conditions in laser oscillation are similar to those described before. When the discharge input is for instance 7 KW, the laser output of the oscillator of the invention is higher by about 40% than that of the conventional one and accordingly the oscillation efficiency is also higher by about 40%. Furthermore, as is apparent from the figure, the output saturation phenomenon in the output characteristic accompanying the conventional oscillator is not caused with the oscillator of the invention. When the laser output is 1 KW, the output variation percentage is about 1%, which is smaller by an order of magnitude than the conventional variation percentage.

The performance of the laser oscillator is remarkably improved by replacing the non-discharge portion by a gas which does not significantly absorb the oscillated laser beam or by vacuum as described above. As a result, the light absorption and heating action of the non-discharge portion can be theoretically disregarded.

In the above-described fourth example, the Brewster window is employed as the transmission window; however. It may be replaced by a transmission window having anti-reflection coatings on both surfaces.

The invention has been described with reference to the three orthogonal axes type $CO_2$ laser oscillator; however, it should be noted that the technical concept of the invention can be applied to other gas circulation type $CO_2$ laser oscillators, such as for instance a so-called two orthogonal axes type gas laser oscillator in which the direction of the gas flow is equal to that of discharge. These directions are orthogonal with the beam axis. In this case also, the same effects described above can be obtained.

As is apparent from the fourth embodiment described with reference to FIG. 8, the absorption loss attributed to $CO_2$ molecules can be substantially disregarded owing to the fact that the non-discharge portions are replaced by a gas which does not significantly absorb the oscillated laser beam or by vacuum. Accordingly, the laser oscillator according to the invention is high in oscillation efficiency and output stability, and it can prevent the partial reflection mirror from being damaged even at the time of high output laser oscillation.

Figure 9:
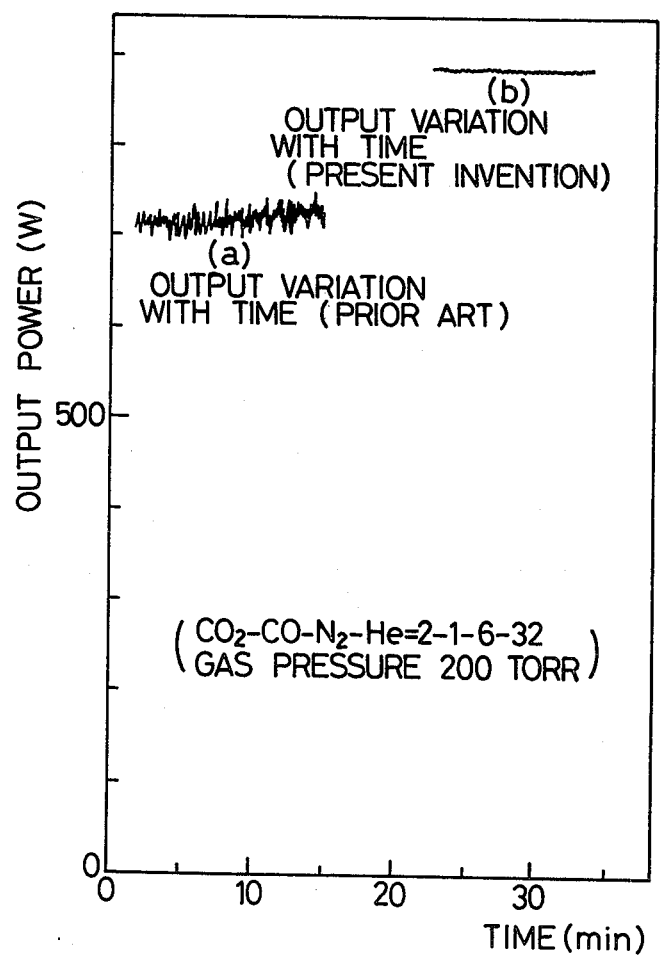
FIG. 9 is an output characteristic diagram indicating the comparison of the output characteristic of the conventional gas laser oscillator with that of the gas laser oscillator of the invention.

FIG. 9 shows actual measurement data. In FIG. 9, reference characters (a) indicates the variations with time of the output of the conventional oscillator, and (b) indicates the variations with time of the output of the example of the oscillator of the invention shown in FIG. 5. The variations with time of the outputs of the other examples (FIGS. 6 through 8) of the invention are substantially similar to that designated by the reference character (b).

What is claimed is:

1. A gas laser oscillator comprising: a laser chamber containing a first active gas medium capable of sustaining laser oscillation in a first region thereof and a second gas medium in a second region thereof, said second gas medium having substantially no amplification function but having a laser beam absorption function;

means for producing an electric discharge disposed in said first region to excite said first gas medium into laser oscillation having an amplification function to thereby generate a laser beam;

a pair of mirrors provided at respective ends of said laser chamber, said mirrors constituting an optical resonator together with said first and second chamber regions;

an input port and an output port provided to and from said second region; and means for selectively introducing said second gas medium into said second region through said input port and means for selectively removing said second gas medium from said second region through said output port to thereby reduce the laser beam absorption function in said second region.

2. A gas laser oscillator as claimed in claim 1 wherein said first and second gas mediums contain carbon dioxide, a mole fraction of carbon dioxide molecules in said second region being smaller than a mole fraction of carbon dioxide molecules in said first region.

3. A gas laser oscillator as claimed in claim 1, wherein said first gas medium contains carbon dioxide molecules, and said second gas medium contains a number of carbon dioxide molecules smaller than that of said first gas medium.

4. A gas laser oscillator as claimed in claim 3 wherein said second gas medium contains no carbon dioxide molecules.

5. A gas laser oscillator as claimed in claims 1, 2, 3 or 4 wherein said means for selectively introducing comprises pump means for causing the second gas medium to flow.

6. The gas laser oscillator of claim 5 wherein said pump means causes said second gas medium to flow from said second region into said first region.

7. The gas laser oscillator of any one of claims 1, 2 or 3 wherein said means for selectively introducing comprises a by-pass duct connecting a selected portion of said chamber to said input port, and a blower for controlling gas flow through said by-pass duct.

8. A gas laser oscillator, comprising: a laser chamber defining first and second regions; said first region containing a first active gas medium capable of sustaining laser oscillation and having an amplification function; discharge electrode means disposed within said first gas medium for exciting said gas medium into laser oscillation to thereby generate a laser beam; said second region containing a second gas medium and having a laser beam absorption function and substantially no amplification function; a pair of mirrors provided at respective ends of said laser chamber, said mirrors constituting an optical resonator together with said first and second chamber regions; and blower means for supplying said first gas medium to said first region and for causing said second gas medium in said second region to flow.

9. A gas laser oscillator as claimed in claim 8, further comprising a cooler provided in the flow path of the second gas medium in said second region to cool said second gas medium before said second gas medium reaches said second region.

10. A gas laser oscillator as claimed in claim 8, wherein said chamber comprises a side wall, a reflection mirror inside said chamber, the positional relation between said side wall and said reflection mirror, in a laser beam direction, is such that said reflection mirror is closer to said first gas medium than said side wall, and said reflection mirror is in the flow path of said second gas medium in said second region.

11. The gas laser oscillator of claim 8 wherein said blower causes said second gas medium to flow through said second region into said first region.

12. A gas laser oscillator, comprising:
a laser chamber;
an active gas medium capable of sustaining laser oscillation disposed within said chamber;
discharge electrode means disposed within said gas medium for exciting said gas medium into laser oscillation to thereby generate a laser beam;
a pair of mirrors disposed on respective ends of said laser medium at predetermined distances from said laser medium;
at least one window means disposed intermediate one of said ends of said laser medium and one of said pair of mirrors for providing for the transmission of a laser beam therethrough; and
closure means connected to said window means and to said chamber for defining at least one closed space between one of said pair of mirrors and said window means, said closed space being maintained substantially at a vacuum.

13. The gas laser oscillator of claim 12 further comprising means for causing said gas medium to flow along a path within said container, at least a portion of said closed space extending into the path of said gas medium.

14. A gas laser oscillator, comprising:
a laser chamber;
means for providing a flowing active gas medium capable of sustaining laser oscillation within said chamber;
discharge electrode means disposed within said gas medium for exciting said gas medium into laser oscillation to thereby generate a laser beam;
a pair of mirrors disposed on respective ends of said laser medium at predetermined distances from said laser medium;
at least one window means disposed intermediate of one of said ends of said laser medium and one of said pair of mirrors for providing for the transmission of a laser beam therethrough; and
closure means connected to said window means and to said chamber for defining at least one closed space between one of said pair of mirrors and said window means, at least a portion of said closed space extending into the path of said flowing gas medium.

* * * * *